(12) United States Patent
Miller et al.

(10) Patent No.: US 10,933,455 B2
(45) Date of Patent: Mar. 2, 2021

(54) TUBULAR CORE AND METHOD

(71) Applicants: Robert F. Miller, Lafayette, CA (US); Garrett Colin Gersten, Livermore, CA (US); Russell L. Hinckley, Sr., Modesto, CA (US); Michael Francis Kraut, San Francisco, CA (US)

(72) Inventors: Robert F. Miller, Lafayette, CA (US); Garrett Colin Gersten, Livermore, CA (US); Russell L. Hinckley, Sr., Modesto, CA (US); Michael Francis Kraut, San Francisco, CA (US)

(73) Assignee: Pacific Roller Die Company, Inc., Hayward, CA (US)

( * ) Notice: Subject to any disclaimer, the term of this patent is extended or adjusted under 35 U.S.C. 154(b) by 0 days.

(21) Appl. No.: 14/999,845

(22) Filed: Jul. 7, 2016

(65) Prior Publication Data

US 2018/0086593 A1  Mar. 29, 2018

(51) Int. Cl.
*B21C 37/12* (2006.01)
*B65H 75/10* (2006.01)
*B21C 47/02* (2006.01)

(52) U.S. Cl.
CPC .......... *B21C 37/124* (2013.01); *B21C 37/121* (2013.01); *B21C 47/02* (2013.01); *B65H 75/10* (2013.01); *B65H 2401/15* (2013.01)

(58) Field of Classification Search
CPC ... B21C 37/121; B21C 37/122; B21C 37/124; B21C 37/12; B21C 47/02; B65H 75/10; B65H 2401/15
See application file for complete search history.

(56) References Cited

U.S. PATENT DOCUMENTS

| | | | |
|---|---|---|---|
| 3,247,692 A | | 4/1966 | Davis |
| 3,435,852 A | * | 4/1969 | Trihey .................... B21C 37/12 138/122 |
| 3,499,307 A | * | 3/1970 | Hutton .................. B21C 37/124 72/135 |
| 3,777,530 A | * | 12/1973 | Jansson ................... B21C 37/02 72/129 |
| 3,913,623 A | | 10/1975 | Siegwart |
| 3,940,962 A | | 3/1976 | Davis |
| 4,763,830 A | | 8/1988 | Davis |
| 4,791,800 A | | 12/1988 | Alexander |

(Continued)

FOREIGN PATENT DOCUMENTS

| | | |
|---|---|---|
| KR | 2014/0040470 A | 4/2014 |
| WO | WO 95/30854 A1 | 11/1995 |
| WO | WO 2012/043924 A1 | 4/2012 |

*Primary Examiner* — Pradeep C Battula
(74) *Attorney, Agent, or Firm* — Philip A. Dalton

(57) ABSTRACT

Disclosed is a tubular core on which sheets of metal or other material can be wound and supported, for shipment, handling and dispersal, and a method for forming the core. The core comprises a metal sheet or strip which has a rectangular-ribbed cross-sectional profile comprising rectangular, flat ribs, and which is wound spirally into a tubular configuration. The core is formed by passing the strip through a plurality of roll-forming stands, to progressively form sections of the ribs and progressively define the sections into the rectangular ribbed profile in which the flat ribs collectively form a support surface for the sheets which are to be wound on the core.

9 Claims, 2 Drawing Sheets

(56) References Cited

U.S. PATENT DOCUMENTS

| | | | |
|---|---|---|---|
| 4,838,317 A | | 6/1989 | Andre |
| 5,074,138 A | | 12/1991 | Miller |
| 5,096,521 A | * | 3/1992 | Schouten ............... B21C 37/124 |
| | | | 138/134 |
| 5,158,115 A | | 10/1992 | Miller |
| 5,158,814 A | * | 10/1992 | Foti ....................... B21C 37/121 |
| | | | 138/122 |
| 6,006,565 A | | 12/1999 | Carson |
| 6,009,912 A | | 1/2000 | Andre |
| 7,040,569 B2 | | 5/2006 | Schafer |
| 7,404,308 B2 | * | 7/2008 | Zepp ..................... B21C 37/124 |
| | | | 72/180 |
| 7,757,720 B1 | * | 7/2010 | Miller ..................... F16L 11/16 |
| | | | 138/122 |
| 8,985,160 B2 | | 3/2015 | Twist |
| 8,991,439 B2 | | 3/2015 | Twist |
| 2007/0245789 A1 | * | 10/2007 | Zepp ..................... B21C 37/121 |
| | | | 72/49 |
| 2008/0072642 A1 | | 3/2008 | Zepp |
| 2018/0099320 A1 | | 4/2018 | Miller |

\* cited by examiner

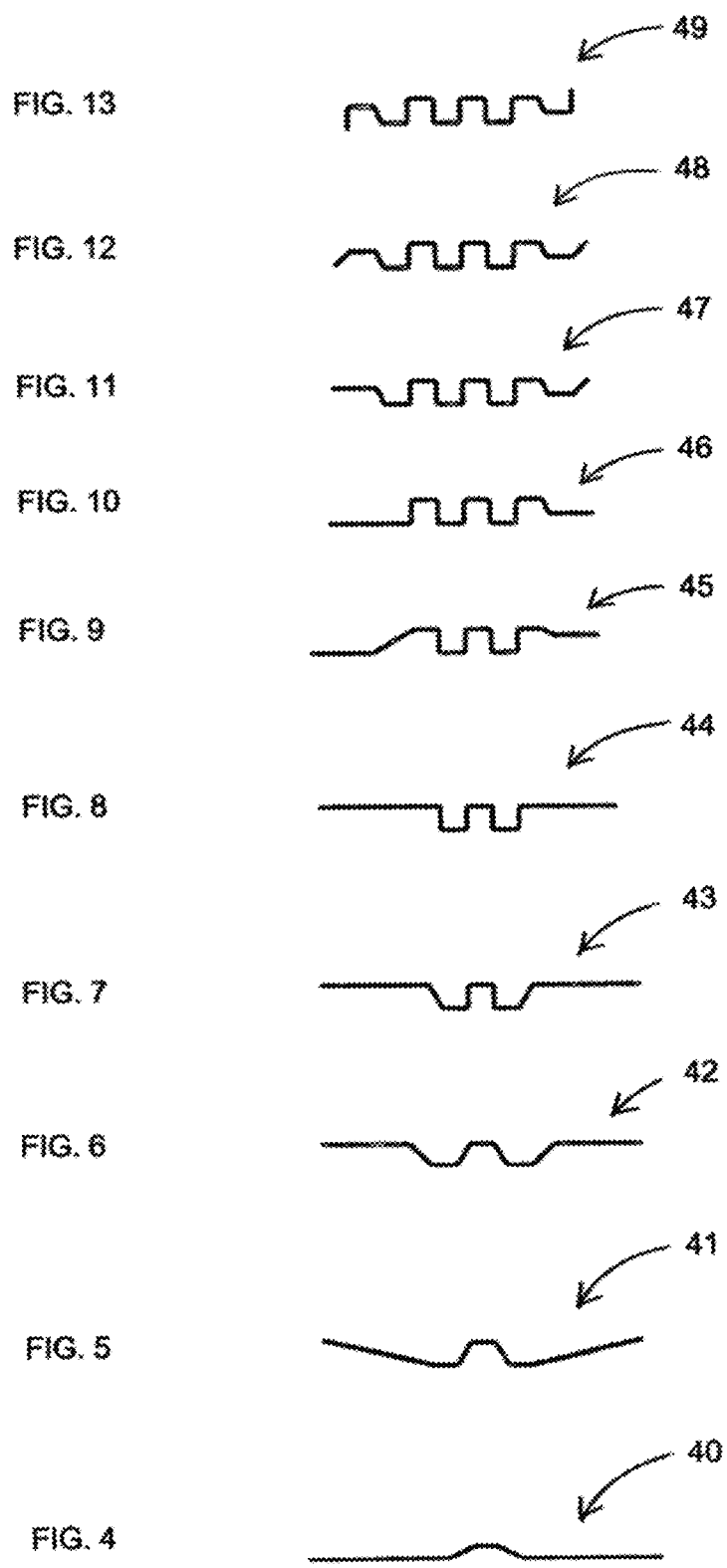

TUBULAR CORE AND METHOD

BACKGROUND OF THE INVENTION

The words "pipe" and "tube" are used interchangeably here.

This invention relates to relatively small diameter pipes or tubes and in particular to tubular cores on which sheets of metal or other material can be wound for shipment, handling and dispersal. As used here, the word dispersal includes mounting a core and a sheet wound thereon on an uncoiler, then rotating the core to unwind the sheet and feed the sheet to apparatus for forming the sheet into other goods (beverage cans, automotive body parts, etc.).

Cores comprising paper or cardboard and glue are widely used for the above purposes. For example, beverage can stock material can be manufactured using cores which are formed to various diameters, for example, inside diameters of 16", 20" or 24", from paper fiber about 0.5" to 1" thick. These cores are non-recyclable and must be disposed of in dumps or landfills, with the attendant cost and detrimental impact on the environment. These cores can be crushed to facilitate storage and disposal, but this can be a problem because of their bulk and the difficulty in crushing them.

Tubes or pipes formed from metal strips are known in the art. See, for example, commonly assigned U.S. Pat Nos. 3,940,962 and 3,247,692 in the name of Paul K. Davis, which disclose the so-called three-roll free forming method and apparatus for forming pipes. According to these patents, an elongated strip of metal is advanced in a generally planar path along its longitudinal axis and into forming stands which form the strip into a profile, then the profiled strip is fed into a tube forming machine at which the strip is curled or wrapped between three sets of rollers (lead, mandrel and buttress rollers) into helical tubes. The sets of rollers extend in rows at an angle relative to the longitudinal axis of the incoming strip, the helix angle, which is so related to the radius of the helical convolutions and the width of the incoming strip that the trailing edge of a preceding portion of the strip converges into contact with the leading edge of the following portion of the strip. The '962 patent also teaches diameter control. The tubes formed in accordance with the '692 and '962 patents are used in a variety of applications. U.S. Pat. Nos. 3,940,962 and 3,247,692 are hereby incorporated by reference in their entirety.

Metal tubes or pipes have the potential for use as small diameter recyclable cores, but to date their use has been limited because of the difficulty of forming metal into small diameter tubes. For a given sheet thickness, smaller diameter tubes require greater force to deform the sheet and form the pipe. Also, decreasing the thickness of the tube wall (the thickness of the tube-forming sheet or strip) increases the tendency to buckle. In addition, it is more difficult to control the diameter and to maintain a consistent lockseam as the tube is formed.

Commonly assigned U.S. Pat. No. 5,074,138 in the name of Robert F. Miller describes an improvement of the invention disclosed in incorporated U.S. Pat. No. 3,247,692. The improvement involves the design and manufacture of a lockseam pipe which has a corrugated, sinusoidal profile comprising arcuate/semi-circular ridges and grooves, and which is adapted for improving the physical characteristics of the pipe and the strength of the lockseam. U.S. Pat. No. 5,074,138 is hereby incorporated by reference in its entirety.

SUMMARY OF THE INVENTION

The present invention is embodied in the structure and manufacture of a thin wall bellows tube or pipe which is formed from a metal strip having a rectangular ribbed profile. In one aspect the tube is used as a core onto which a sheet of material can be wound or coiled for shipment, handling and dispersal. In a particular aspect this invention relates to the structure and manufacture of such a core from strips of metal and, more particularly, from a thin strip of metal such as aluminum.

BRIEF DESCRIPTION OF THE DRAWING

FIGS. 4-13 depict the changes in the profile of a strip or sheet at sequential stages of the profile-forming process.

DETAILED DESCRIPTION

The pipe forming in accordance with the present invention can be achieved via fixed forming using a forming shoe with a predetermined inside diameter to provide the desired pipe diameter, or by free forming using several sets of roller dies of different sizes to achieve pipes of different diameters, by adjusting the helix angle or by a combination thereof.

The illustrative equipment and process described here use, and are improvements of, the multi-pass roll former, three roll, free forming system disclosed in commonly assigned and incorporated U.S. Pat. Nos. 3,940,962 and 3,247,692 as specifically adapted to bellows pipe (relatively small diameter corrugated pipe) in commonly assigned and incorporated U.S. Pat. No. 5,074,138.

Figure 1:
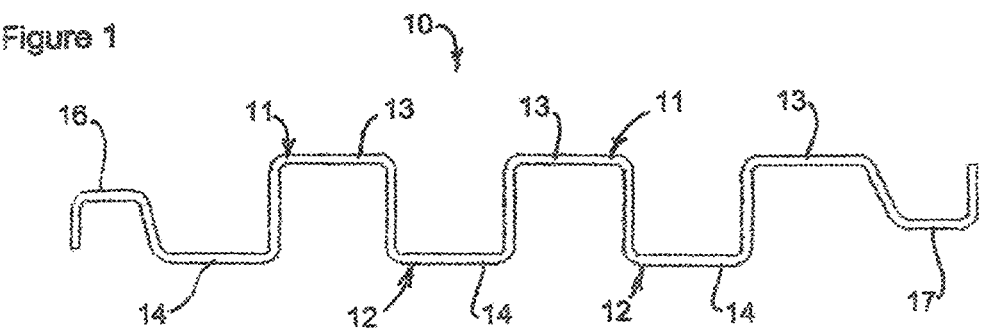
FIG. 1 is a transverse cross-section of a metal strip having a rectangular corrugated transverse profile formed therein in accordance with the present invention, and preparatory to the strip being helically wound into a tubular core.

According to the present invention and referring to FIG. 1, initially a flat metal strip or sheet is roll-formed to a desired profile.

Referring to FIGS. 4-13, according to the present invention, a flat metal strip or sheet is passed through multiple stands of forming rolls to initially form rectangular features and/or straight line segments of rectangular features and to progressively add to and refine these segments and features to form the desired rectangular ribbed profile. More specifically, FIGS. 4-13 depict the sequence of changes in the strip profile starting with the initial flat strip profile and progressing through the finished rectangular ribbed profile. The ten FIGS. 4-13 depict the associated profiles 40-49 after the strip is driven through each of the ten stands of forming rollers. Illustratively, ten passes through roll-forming stands are used to form the profile.

The above profile-forming method results in the profile 10 shown in FIG. 1 which comprises alternating rectangular ribs in the form of rectangular ridges 11 and rectangular grooves 12. The ridges 11 have flat top or upper surfaces 13 and the grooves 12 have flat bottom or lower surfaces 14. A downward (or upward) opening flange or tab 16 is formed extending along one longitudinal edge of the strip or sheet transverse to the width of the strip and an opposite opening upward (or downward) extending tab 17 is formed extending along the opposite longitudinal edge of the strip.

Figure 2:
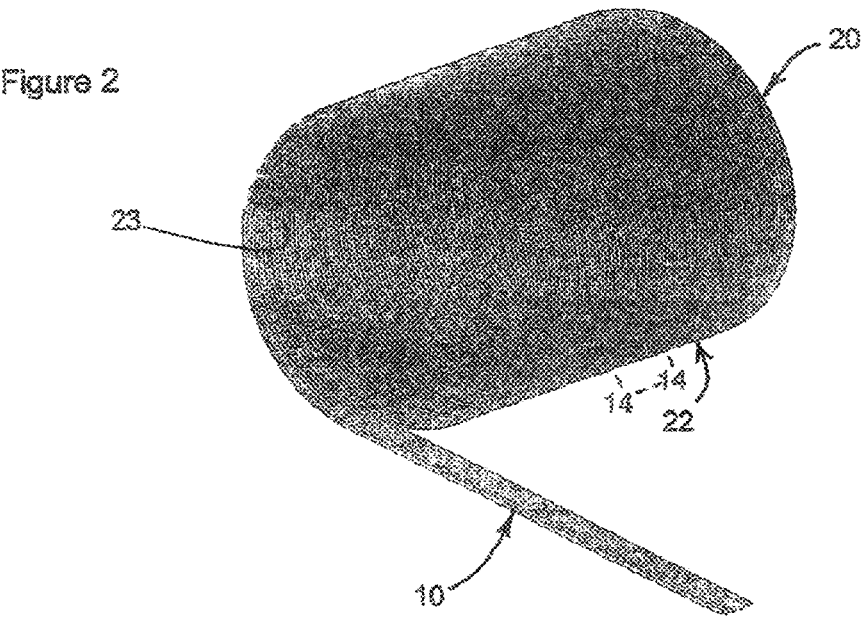
FIG. 2 depicts a strip such as that of FIG. 1 being wound into a helical tubular core.
Figure 3:
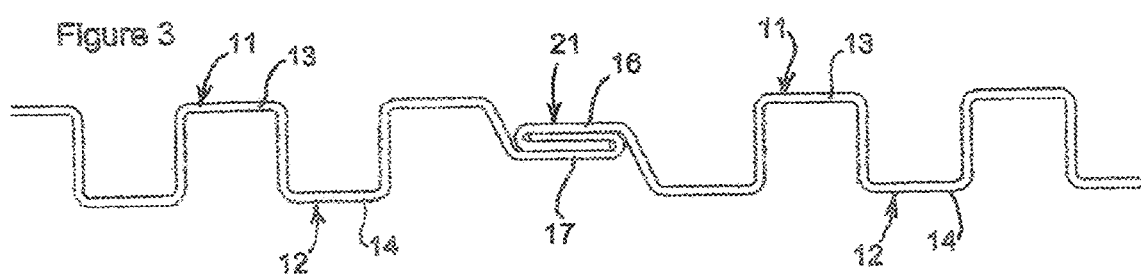
FIG. 3 is a transverse cross-section of two adjacent windings of a strip such as that of FIG. 1 where the strip is helically wound to form a core such as that of FIG. 2, and the leading edge of one winding of the strip is joined by a lockseam to the trailing edge of the adjacent winding.

To form the profiled strip into a tube or core, and referring to FIG. 2, the rectangular-ribbed profile strip or sheet 10 is wrapped using helical forming apparatus into a cylindrical pipe or core 20 of the desired diameter and, as shown in FIG. 3, the mating tabs 16 and 17 are compressed together to form a four-ply interlocked helical seam 21 which wraps around the pipe lengthwise along the pipe. The strip edges are held together via a continuous mechanical lockseam which is pushed together to lock the lockseam.

In the formed pipe 20, the spaced-apart adjacent flat surfaces 14 of the rectangular grooves/ribs 12 form the outside surface 22 of the core 20 and the spaced-apart flat surfaces 13 of the rectangular ridges/ribs 11 form the inside surface 23 of the core.

The strip 10 illustrated in FIG. 1 is symmetrical top-to-bottom and thus can be reversed top-to-bottom during the pipe wrapping process depicted in FIG. 2. Then the spaced-apart flat ridge/rib surfaces 13 form the outer surface 22 of the core and the spaced-apart flat groove/rib surfaces 14 form the inside surface of the core.

Referring to the FIG. 3 cross-section of the core 20 depicted in FIG. 2, in the pipes made in accordance with the present invention, the ridges and grooves maintain their generally rectangular, ribbed shape and form an open structure with spacing between the adjacent ridges 11 as well as spacing between the adjacent grooves 12. This is unlike prior designs which use non-rectangular shapes and/or an additional deformation step to form a continuous outer surface in order to provide the required strength and integrity and to provide ample flat surface area for sheet support. The outer surface is interrupted by the spacing of the inside rectangles. In a present embodiment, the width of the ridges and the grooves, and the spacing between adjacent ridges and between adjacent grooves, are all equal.

Embossments or reinforced embossments can be formed in the ribs, e.g., in the vertical legs of the ribs, to provide additional strength to the core.

EXAMPLES

The above design and method have been used to form cylindrical cores of different sizes.

Specifically, in strips or sheets 10 of aluminum which were 0.010" to 0.023" thick and 3⅝" wide, ridges 11 and grooves 12 were formed which were 0.27" in height from the top of the a ridge to the bottom of the adjacent groove. Both the ridges and the grooves were 0.27" wide and were spaced apart 0.27" from adjacent ridges and grooves, respectively. See FIG. 1. The rectangular corrugated strips or sheets 10 were fed to three-roll apparatus using helix angles≥60° measured from the axis of the outgoing pipe to form continuous length pipes of 16", 20" and 24" inside diameters. The pipes 20 were then cut into various lengths for use as recyclable cores onto which sheets of metal such as aluminum were to be wound for handling and dispersal.

Other dimensions and materials will be readily adapted to the invention described here by those of usual skill in the art. For example the invention can be used to form pipes approximately 6" in diameter and greater. For a given sheet width, increasing the helix angle increases the pipe diameter. For a given pipe diameter, increasing the sheet width reduces the required helix angle. Increasing the strip width tends to increase the pipe wrapping/manufacturing speed and to decrease the number of seams in a given length of pipe.

What is claimed is:

1. A method for forming corrugated ribs along an elongated metal strip in which the ribs have straight top, bottom and side surfaces extending lengthwise along the strip and in transverse cross-section adjacent straight surfaces form straight lines oriented at selected angles, the method comprising:
   (1) passing an elongated metal strip through a first roller stand or a first group of roller stands for bending the strip slightly at selected points along the width of the strip to form an initial structure proximate the center of the width of the strip, the initial structure having adjacent straight surfaces extending along the strip and in cross-sectional profile the adjacent straight surfaces forming straight lines oriented at angles between 180 and 90 degrees at the selected points;
   (2) passing the strip through a multiplicity of roller stands for sequentially extending the initial structure at opposite sides thereof by bending the strip slightly at additional selected points on the opposite sides of the initial structure (a) to form additional adjacent straight surfaces which in cross-section form straight lines oriented at angles between 180 and 90 degrees at the selected points and (b) to provide a predetermined total number of bends along the width of the strip and a predetermined total number of adjacent straight surfaces; and
   (3) interspersed with and subsequent to forming the bends in step (2), bending previously formed bends one or more additional times as required until the surfaces of each pair of adjacent straight surfaces are oriented at their selected angle while maintaining the previously formed straight surfaces straight throughout steps (2) and (3).

2. The method of claim 1 wherein the metal strip is aluminum and is 0.005" to 0.050" thick.

3. The method of claim 1 wherein the selected angles are approximately 90 degrees.

4. The method of claim 3 wherein the metal strip is aluminum and is 0.005" to 0.050" thick.

5. A method for forming a metal strip into a cylindrical core for supporting a strip of material wound thereon, comprising:
   passing an elongated metal strip having width and length and opposite longitudinal edges through a multiplicity of forming stands for forming the metal strip into segments substantially all of which are angularly related generally straight segments and for changing the size and shape of the segments previously formed at said forming stands while maintaining the generally straight configuration of the segments, wherein upon the completion of the forming process the formed metal strip comprises a transverse corrugated profile of longitudinally extending, alternating ridges and grooves having generally vertical spaced-apart sidewalls with the ridges further comprising longitudinally extending, flat, spaced-apart top surfaces extending between adjacent ridge sidewalls in an array of ridges forming a support surface and the grooves further comprising longitudinally extending, flat, spaced-apart bottom surfaces extending between adjacent groove sidewalls in an array of grooves forming a support surface, the flat ridges and the flat grooves together forming a rectangular, flat ribbed corrugated cross sectional profile extending along the width of the metal strip transverse to the length thereof; and
   helically coiling the formed metal strip into a cylinder having an outer support surface selected from the support surface formed by the array of ridge surfaces and the support surface formed by the array of groove surfaces.

6. A method for forming a metal strip into a cylindrical core for supporting a strip of material wound thereon comprising: a corrugation forming process of passing an elongated metal strip having width and length and opposite longitudinal edges through a multiplicity of forming stands which form the metal strip into segments substantially all of which are angularly related generally straight segments and change the size and shape of the segments previously formed at said forming stands while maintaining the generally straight configuration of the segments, wherein upon the completion of the corrugation forming process the formed metal strip comprises longitudinally extending, alternating ridges and grooves having generally vertical spaced-apart sidewalls with the ridges further comprising longitudinally extending, flat, spaced-apart top surfaces extending between adjacent ridge sidewalls and the grooves further comprising longitudinally extending, flat, spaced-apart bottom surfaces extending between adjacent groove sidewalls, the flat ridges and the flat grooves together forming a rectangular, flat ribbed cross sectional profile extending along the width of the metal strip transverse to the length thereof;

forming the opposite longitudinal edges of the formed metal strip into flanges adapted for forming an interlocking seam; helically coiling the formed metal strip into a cylinder having a longitudinal axis and an outer surface defined by flat, spaced-apart surfaces selected from the top surfaces and the bottom surfaces; and compressing the opposite edge flanges together thereby forming an interlocking seam extending in a spiral around the cylinder along the longitudinal axis thereof.

7. The method of claim 6 wherein the metal strip is aluminum and is 0.005" to 0.050" thick.

8. The method of any of claims 6 and 7 wherein during the helical coiling step, the metal strip is oriented at a helix angle of approximately 60° or greater relative to the longitudinal axis.

9. The method of any of claims 6 and 7 wherein during the helical coiling step, the metal strip is oriented at a helix angle relative to the longitudinal axis selected for forming a cylinder having a diameter of at least approximately 6".

\* \* \* \* \*